United States Patent
Tang et al.

(10) Patent No.: US 9,652,661 B2
(45) Date of Patent: May 16, 2017

(54) METHOD AND TERMINAL DEVICE FOR IMAGE PROCESSING

(71) Applicant: Xiaomi Inc., Beijing (CN)

(72) Inventors: Mingyong Tang, Beijing (CN); Bo Zhang, Beijing (CN); Xiao Liu, Beijing (CN); Lin Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/462,577

(22) Filed: Aug. 19, 2014

(65) Prior Publication Data
US 2015/0146987 A1 May 28, 2015

Related U.S. Application Data

(63) Continuation of application No. PCT/CN2014/077463, filed on May 14, 2014.

(30) Foreign Application Priority Data

Nov. 28, 2013 (CN) .......................... 2013 1 0626089

(51) Int. Cl.
G06K 9/66 (2006.01)
G06K 9/00 (2006.01)
G06T 11/60 (2006.01)

(52) U.S. Cl.
CPC .......... G06K 9/00221 (2013.01); G06T 11/60 (2013.01)

(58) Field of Classification Search
CPC .................. A45D 44/005; G06T 11/60; G06T 2207/10024; G06T 2207/30196
USPC .............. 382/115, 118, 195, 167, 209, 278; 340/5.81, 5.83
See application file for complete search history.

(56) References Cited

U.S. PATENT DOCUMENTS 6,571,003 B1   5/2003   Hillebrand et al.
6,687,418 B1 * 2/2004   Ludwig .................. G02B 27/46
                                                         382/280
(Continued)

FOREIGN PATENT DOCUMENTS

CN    101308578 A    11/2008
CN    102027505 A    4/2011
(Continued)

OTHER PUBLICATIONS

"International Search Report for PCT/CN2014/077463".
(Continued)

*Primary Examiner* — Yosef Kassa
(74) *Attorney, Agent, or Firm* — Jun He Law Offices P.C.; James J. Zhu

(57) ABSTRACT

The present disclosure relates to a method and terminal device for processing an image. The method includes: acquiring face information from a template image, if receiving a request for processing an image containing a face; and applying a photo makeover on the face according to the face information acquired from the template image. By acquiring face information from a template image and automatically applying a photo makeover on the face according to the face information acquired from the template image, manual setting for makeover parameters will be avoided and the efficiency will be improved.

15 Claims, 7 Drawing Sheets

(56) References Cited

U.S. PATENT DOCUMENTS

| | | | |
|---|---|---|---|
| 6,931,147 B2 * | 8/2005 | Colmenarez | G06F 17/30265 382/118 |
| 7,133,155 B2 * | 11/2006 | Patton | G03B 27/735 348/E9.04 |
| 7,206,445 B2 * | 4/2007 | Takemoto | G06T 11/001 382/162 |
| 7,251,054 B2 * | 7/2007 | Takemoto | H04N 1/622 358/1.9 |
| 7,649,551 B2 * | 1/2010 | Ohmura | H04N 1/00127 348/14.05 |
| 7,796,827 B2 * | 9/2010 | Lin | G06K 9/00234 348/207.2 |
| 8,059,187 B2 * | 11/2011 | Nakajima | H04N 5/23219 348/362 |
| 8,265,351 B2 * | 9/2012 | Aarabi | G06K 9/00234 382/118 |
| 8,498,456 B2 * | 7/2013 | Legagneur | A45D 44/005 382/118 |
| 8,523,570 B2 * | 9/2013 | Mallick | G06Q 30/02 434/100 |
| 8,550,818 B2 * | 10/2013 | Fidaleo | G06Q 30/0268 434/100 |
| 8,620,038 B2 * | 12/2013 | Aarabi | G06K 9/00281 382/118 |
| 8,660,319 B2 * | 2/2014 | Aarabi | G06K 9/00228 382/100 |
| 2004/0085324 A1 | 5/2004 | Yao | |
| 2006/0062435 A1 | 3/2006 | Yonaha | |
| 2006/0132506 A1 | 6/2006 | Utsugi | |
| 2010/0189357 A1 | 7/2010 | Robin et al. | |
| 2013/0141605 A1 | 6/2013 | Kim et al. | |

FOREIGN PATENT DOCUMENTS

| | | |
|---|---|---|
| CN | 102254180 A | 11/2011 |
| CN | 102486868 A | 6/2012 |
| CN | 102546945 A | 7/2012 |
| CN | 102999929 A | 3/2013 |
| CN | 103258343 A | 8/2013 |
| CN | 103413268 A | 11/2013 |
| CN | 103605975 A | 2/2014 |
| CN | 103632165 A | 3/2014 |
| EP | 1030267 A1 | 8/2000 |
| JP | 2013501292 A | 1/2013 |
| RU | 2451333 C2 | 5/2012 |
| WO | 92/02000 | 2/1992 |
| WO | 2013/104015 A1 | 7/2013 |

OTHER PUBLICATIONS

"Extended European search report for 14193353.1".

Article XP55183983A Create the ideal portrait with Arcsoft's Perfect365.

Article XP55183988A Arcsoft's Perfect365 Portrait Makeover Now Available for Windows Phone 8.

Zhen Bei-bei et al. "A digital face make-up algorithm based on example image" Journal of Yunnan University, Dec. 31, 2010, vol. 32, S2, p. 27-32, CN 53-1045/N ISSN 0258-7971.

* cited by examiner

METHOD AND TERMINAL DEVICE FOR IMAGE PROCESSING

CROSS REFERENCE TO RELATED APPLICATION

This application is a Continuation of International Application No. PCT/CN2014/077463, filed on May 14, 2014, which is based upon and claims the benefit of priority to Chinese Patent Application No. 201310626089.8, filed on Nov. 28, 2013, the entire contents of which are incorporated herein by reference.

TECHNICAL FIELD

The present disclosure generally relates to the technology field of data processing, and more particularly, to a method and a terminal device for processing an image.

BACKGROUND

As cameras and other mobile terminals with a camera have become popular, it is increasingly convenient for people to take pictures. Therefore, the number of pictures taken is becoming increasingly huge. Normally, a picture, after being taken, can be applied with a photo makeover and then sent to a social media platform such as a blog, a micro blog, and an individual web space to be shared with friends and family members.

Usually, a user needs to manually set makeover parameters (makeover parameters such as face slimming, eyes enlarging, skin softening, etc.) one by one, which is uneasy and inconvenient for the user to apply the photo makeover.

SUMMARY

Accordingly, the present disclosure provides a method and terminal device for processing an image to automatically perform a photo makeover, and thus improve the efficiency.

According to a first aspect of the embodiments of the present disclosure, there is provided a method for processing an image, comprising: acquiring face information from a template image, if receiving a request for processing an image containing a face; and applying a photo makeover on the face according to the face information acquired from the template image According to a second aspect of the embodiments of the present disclosure, there is provided a terminal device, comprising: one or more processors; a memory; and one or more instruction modules stored in the memory and configured to be executed by the one or more processors, the one or more instruction modules comprising instructions for: acquiring face information from a template image, if receiving a request for processing an image containing a face; and applying a photo makeover on the face according to the face information acquired from the template image.

According to a third aspect of the embodiments of the present disclosure, there is provided a non-transitory readable storage medium including instructions, executable by one or more processors in a terminal device, for performing a method for processing an image, the method comprising: acquiring face information from a template image, if receiving a request for processing an image containing a face; and applying a photo makeover on the face according to the face information acquired from the template image.

The technical solutions provided by the embodiments of the present disclosure may have the following advantageous effects. In the embodiments of the present disclosure, by acquiring face information from a template image and automatically applying a photo makeover on the face according to the face information acquired from the template image, manual setting for makeover parameters will be avoided and the efficiency will be improved.

Other features and advantages of the disclosure will be set forth in the following description. Moreover, they will become more apparent partly from the description, or be understood by implementing the disclosure. The objects and other advantages of the disclosure may be realized and achieved by structures particularly specified in the written description, the claims and the accompanied drawings.

It should be appreciated that, the above general description and the detailed description below are merely exemplary, which do not limit the disclosure.

Hereinafter, a further detailed description will be given to the technical solutions of the disclosure with reference to the accompanied drawings and the embodiments.

BRIEF DESCRIPTION OF THE DRAWINGS

The accompanied drawings, which are incorporated in and constitute part of this specification, illustrate embodiments consistent with the invention and, together with the description, serve to explain the principles of the invention.

The accompanied drawings which constitute part of the description and serve to explain the present disclosure together with the embodiments of the present disclosure are provided for a better understanding of the present disclosure, but do not constitute any limitation to the present disclosure.

Explicit embodiments of the present disclosure that have been illustrated in the above accompanied drawings will be described in further detail hereinafter. These accompanied drawings and literal description are by no means intended to limit the scope of the idea of the present disclosure, but to explain the concept of the present disclosure to the skilled in the art with reference to the particular embodiments.

DETAILED DESCRIPTION

In order to make the objects, the technical solutions and advantages more clear, the present disclosure will be described in a further detail with reference to the embodiments. Here, the illustrative embodiments of the present disclosure and the description thereof are not intended to limit the present disclosure, but to explain the present disclosure.

A method for processing an image is provided by the embodiments of the present disclosure, which may be described in detail with reference to the accompanied drawings.

In the embodiments of the present disclosure, by acquiring face information from a template image and automatically applying a photo makeover on the face according to the face information acquired from the template image, manual setting for makeover parameters will be avoided and the efficiency will be improved.

Figure 1:
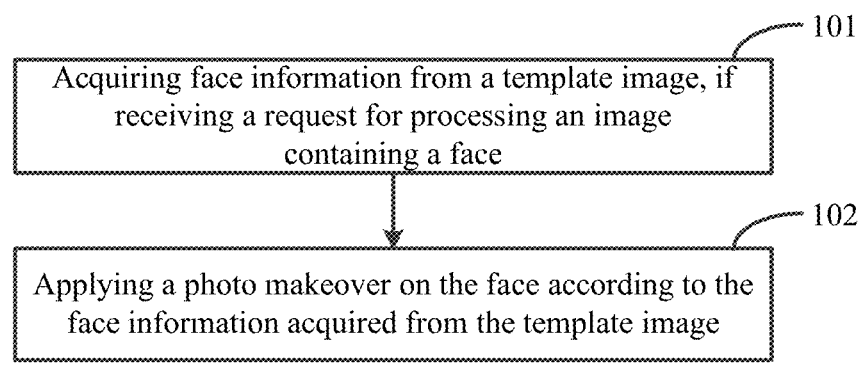
FIG. 1 is an exemplary flowchart collectively illustrating a method for processing an image according to an exemplary embodiment.

In an embodiment, as shown in FIG. 1, a method for processing an image includes the following steps. Moreover, the method according to this embodiment may be performed on a terminal device such as a smart mobile phone, a tablet computer, etc.

In step 101, if a request for processing an image containing a face is received, face information from a template image is acquired.

In this case, the template image may be a template image input by the user, a template image selected by the user, or a template image obtained by other manners to satisfy the various demands of the user. The face information is acquired from the template image through face recognition technology. The face recognition technology is used to identify a person by analyzing and comparing information on visual features of the face, which belongs to a biology recognition technology that distinguishes individuals (such as human beings) according to their biologic features. Currently, the face recognition technology has been applied in many fields, such as, "intelligent face focus" technology and "smile shutter" technology (which is a technology capable of automatically snapping a picture the instant a person smiles) of a digital camera, security and management for enterprises and residences, access control systems, camera monitoring systems, etc. The conventional face recognition algorithms include: feature-based recognition algorithms, appearance-based recognition algorithms, template-based recognition algorithms, or recognition algorithms using neural network, etc.

The face information may include any one or more of positions and intervals of face organs, sizes of the face organs and the face, proportions between the face organs and the face, shapes of the face organs, angles and directions of the face organs, colors of the face organs and colors of the face.

In step 102, a photo makeover is applied on the face in an image to be processed according to the face information acquired from the template image.

In an embodiment, the above-mentioned "a photo makeover is applied on the face in an image to be processed according to the face information acquired from the template image" in step 102 may include the following steps A1-A3.

In step A1, face information from the image to be processed is acquired.

In step A2, a comparison result is obtained by comparing the face information in the template image with the face information in the image to be processed.

In step A3, a photo makeover is applied on the face in the image to be processed according to the comparison result.

For example, the template image is a picture of a superstar. After comparing the face information in the template image with the face information in the image to be processed, if the picture of the superstar contains bigger eyes and the image to be processed contains smaller eyes, then eye enlarging process is performed on the eyes in the image to be processed. Also, if the picture of the superstar contains a uniform proportion between the lips, but the upper lip in the image to be processed is thicker, the proportion between the lips may be adjusted on the image to be processed. Thereby, a photo makeover may be automatically performed to a portion that needs to be treated in the image to be processed, so the user does not need to manually set makeover parameters one by one, which is convenient for the user to perform the photo makeover, and thus saves time and improves the efficiency of the photo makeover.

In an embodiment, the above-mentioned "a photo makeover is applied on the face in an image to be processed according to the face information acquired from the template image" in step 102 may include the following steps B1-B7.

In step B1, face information from the image to be processed is acquired.

In step B2, it is determined whether the face information in the template image and the face information in the image to be processed are the same; if they are the same, the process proceeds to step B3; otherwise, the process proceeds to step B4.

In step B3, a null makeover operation mode is generated, and photo makeover is applied on the face in the image to be processed according to the null makeover operation mode.

In step B4, it is determined whether the difference between the face information in the template image and the face information in the image to be processed is less than or equals to a first threshold; if yes, the process proceeds to step B5; otherwise, the process proceeds to step B6.

In step B5, a first level makeover operation mode is generated, and the photo makeover is applied on the face in the image to be processed according to the first level makeover operation mode.

In step B6, it is determined whether the difference between the face information in the template image and the face information in the image to be processed is greater than a second threshold that is greater than the first threshold; and if yes, the process proceeds to step B7.

In step B7, a second level makeover operation mode is generated, and the photo makeover is applied on the face in the image to be processed according to the second level makeover operation mode.

For example, the face information in the template image is compared with the face information in the image to be processed. If the face information in the template image and the face information in the image to be processed are the same, no photo makeover will be needed. If the difference between the face information in the template image and the face information in the image to be processed is relatively tiny, a slight photo makeover is performed. Alternatively, if the difference between the face information in the template image and the face information in the image to be processed is relatively huge, an extensive photo makeover is performed, thereby satisfying various demands of the user.

In the embodiments of the present disclosure, by acquiring face information from a template image and automatically applying a photo makeover on the face according to the face information acquired from the template image, manual setting for makeover parameters will be avoided and the efficiency will be improved. Moreover, respective photo makeover may be performed according to the difference between the face information in the template image and the face information in the image to be processed, to satisfy various demands of the user.

The various implementation manners of each step of the embodiment shown in FIG. 1 have been illustrated as above. The detailed implementation of the embodiment will be described in detail with reference to several exemplary embodiments hereinafter.

First Exemplary Embodiment

Figure 2A:
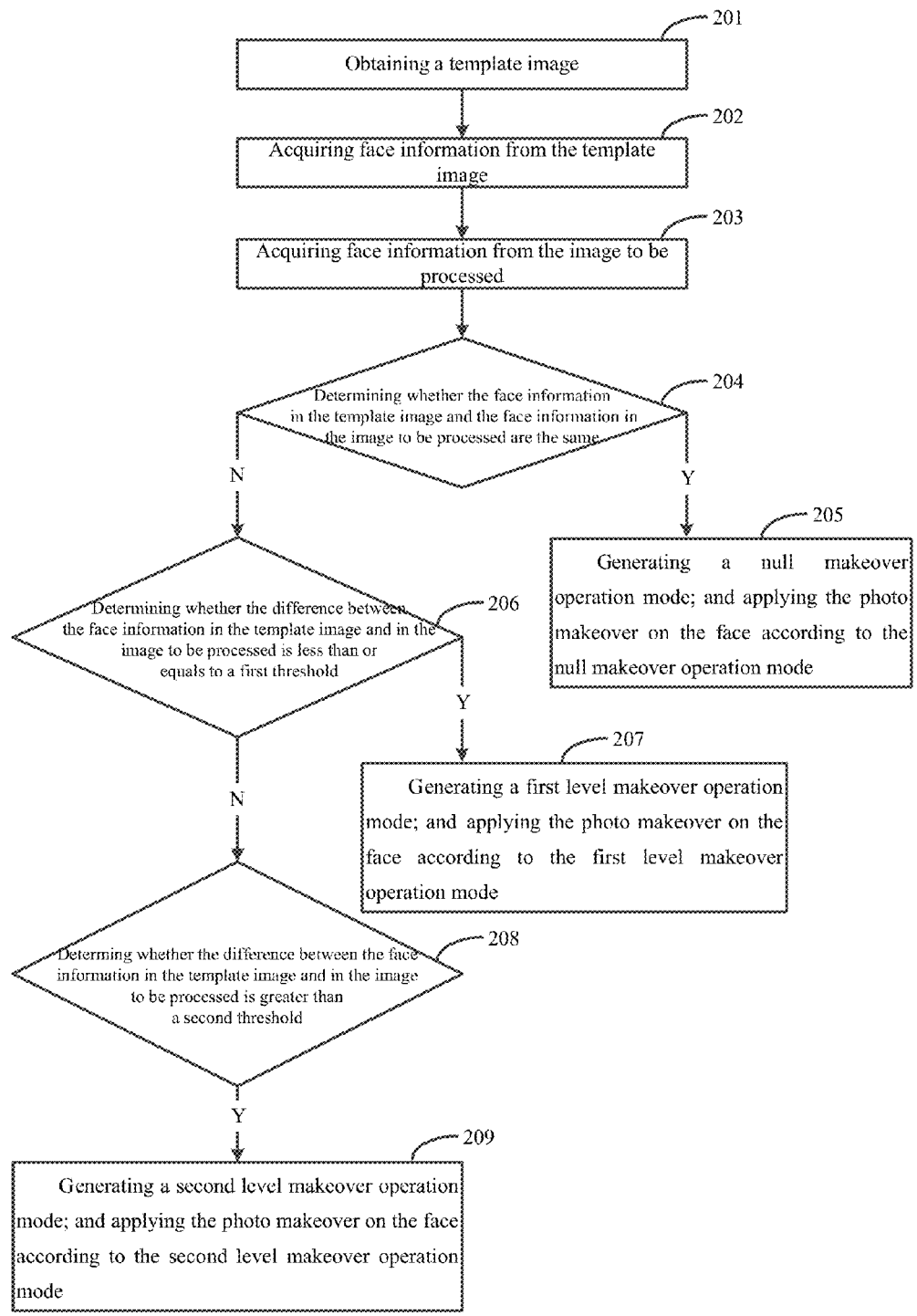
FIG. 2A is an exemplary flowchart illustrating a method for processing an image according to an exemplary embodiment.

In the first exemplary embodiment, a template image selected by the user is acquired and the template image is a picture of a superstar. Then a photo makeover may be performed to a portion that needs to be treated in the image to be processed, according to the face information of the picture of the superstar, so the user does not need to manually set makeover parameters one by one, which is convenient for the user to process, and thus saves time and improves the efficiency of the photo makeover. As shown in FIG. 2A, a method for processing an image includes the following steps.

In step 201, if a request for processing an image containing a face is received, the terminal device permits a user to select or input a template image to obtain the template image for processing the image. For example, the template image is a picture of a superstar.

In step 202, face information in the template image is acquired. In the picture of the superstar, the eyes are big, and the length of the chin is ⅕ of that of the face, which belongs to a standard chin proportion in face aesthetics.

In step 203, face information in the image to be processed is acquired. In the image to be processed, the eyes are small, the length of the chin is ⅙ of that of the face, and the chin is relatively wide.

In step 204, it is determined whether the face information in the template image and the face information in the image to be processed are the same; if they are the same, the process proceeds to step 205; otherwise, the process proceeds to step 206.

In step 205, a null makeover operation mode is generated, and the photo makeover is applied on the face in the image to be processed according to the null makeover operation mode.

In step 206, it is determined whether the difference between the face information in the template image and the face information in the image to be processed is less than or equals to a first threshold; if yes, the process proceeds to step 207; otherwise, the process proceeds to step 208.

In step 207, a first level makeover operation mode is generated, and the photo makeover is applied on the face in the image to be processed according to the makeover process information of the first level makeover operation mode.

In step 208, it is determined whether the difference between the face information in the template image and the face information in the image to be processed is greater than a second threshold that is greater than the first threshold; and if yes, the process proceeds to step 209.

In step 209, a second level makeover operation mode is generated, and the photo makeover is applied on the face in the image to be processed according to the second level makeover operation mode.

For example, in the picture of the superstar, the eyes are big, and the length of the chin is ⅕ of that of the face; while in the image to be processed, the eyes are small, the length of the chin is ⅙ of that of the face, and the chin is relatively wide. Therefore the eyes and the length of the chin need to be adjusted. According to the above steps 204 to 210, an enlarging process is extensively performed on the eyes in the image to be processed, and a lengthening process is lightly performed on the chin in the image to be processed.

Figure 2B:
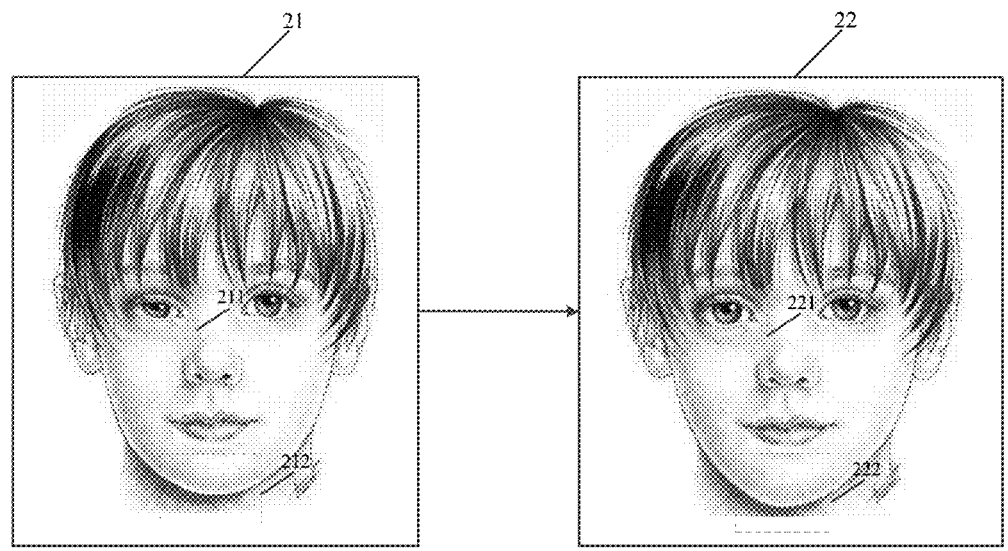
FIG. 2B is a schematic view illustrating an image to be processed before and after applying a photo makeover on a face according to an exemplary embodiment.

As shown in FIG. 2B, which is a schematic view illustrating an image to be processed before and after applying a photo makeover on the face according to an exemplary embodiment, 21 is a schematic view before the makeover, 22 is a schematic view after the makeover, 211 is a schematic view before the makeover on the eye, 221 is a schematic view after the makeover on the eye, 212 is a schematic view before the makeover on the chin, and 222 is a schematic view after the makeover on the chin.

In the first exemplary embodiment, a template image selected by the user is acquired and the template image is a picture of a superstar. Then a photo makeover may be performed to a portion that needs to be treated in the image to be processed, according to the face information of the picture of the superstar, so the user does not need to manually set makeover parameters one by one, which is convenient for the user to process, and thus saves time and improves the efficiency of the photo makeover. Moreover, respective makeover process may be performed according to the difference between the face information in the template image and the face information in the image to be processed, so various demands of the user are satisfied.

Second Exemplary Embodiment

Figure 3A:
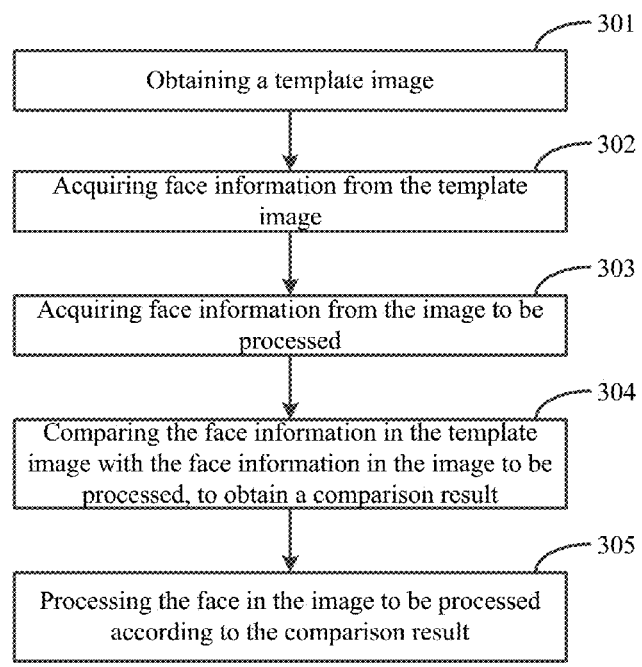
FIG. 3A is an exemplary flowchart illustrating a method for processing an image according to an exemplary embodiment.

In the second exemplary embodiment, a template image selected by the user is acquired and the template image is a picture of a pet. Then a photo makeover may be performed to a portion that needs to be treated in the image to be processed, according to the face information of the picture of the pet, so the user does not need to manually set makeover parameters one by one, which is convenient for the user to process, saves time, and thus improves the efficiency of the photo makeover. As shown in FIG. 3A, a method for processing an image includes the following steps.

In step 301, if a request for processing an image containing a face is received, the terminal device permits a user to select or input a template image to obtain the template image for processing the image. For example, the template image is a picture of a pet.

In step 302, face information in the template image is acquired. In the picture of the pet, the nose is flat, and the color of the lips is roseate.

In step 303, face information in the image to be processed is acquired. In the image to be processed, the nose is tall, and the color of the lips is pale.

In step 304, a comparison result is obtained by comparing the face information in the template image with the face information in the image to be processed.

For example, in the picture of the pet, the nose is flat, and the color of the lips is roseate; while in the image to be processed, the nose is tall, and the color of the lips is pale, so the nose needs not to be adjusted, and the color of the lips needs a reddening makeover to make the lips to look roseate.

In step 305, the face in the image to be processed is processed according to the comparison result.

Figure 3B:
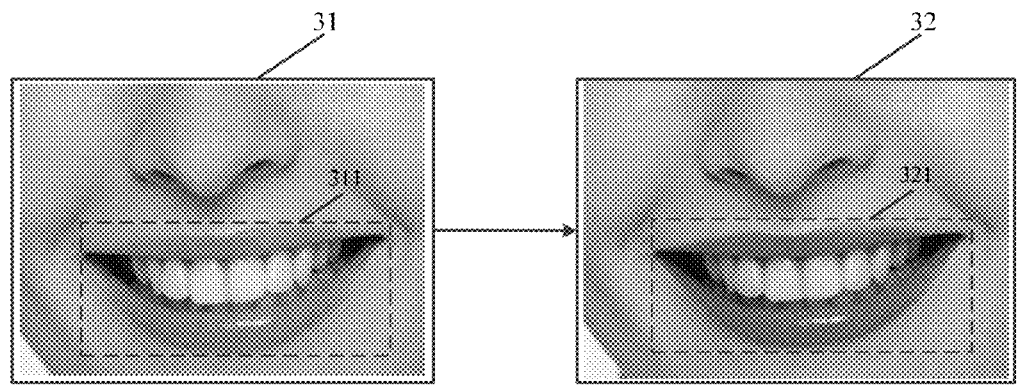
FIG. 3B is a schematic view illustrating an image to be processed before and after applying a photo makeover on a face according to an exemplary embodiment.

As shown in FIG. 3B, which is a schematic view illustrating an image to be processed before and after applying the photo makeover on the face, 31 is a schematic view before the makeover, 32 is a schematic view after the makeover, 311 is a schematic view before the makeover of the color of the lips, and 321 is a schematic view after the makeover of the color of the lips.

In the second exemplary embodiment, a template image selected by the user is acquired and the template image is a picture of a pet. Then a photo makeover may be performed to a portion that needs to be treated in the image to be processed, according to the face information of the picture of the pet, so the user does not need to manually set makeover parameters one by one, which is convenient for the user to process, saves time, and improves the efficiency of the photo makeover. Moreover, respective photo makeover may be performed according to the difference between the face information in the template image and the face information in the image to be processed, so various demands of the user are satisfied.

It should be noticed that, in practical application, all the above optional implementation manners may be variedly combined, to form optional embodiments of the present disclosure, which will not be repeated herein.

The implementing manners of the method for image processing may be understood from the above description, which may be realized by an apparatus. The internal structure and functions of the apparatus will be illustrated hereinafter.

Figure 4:
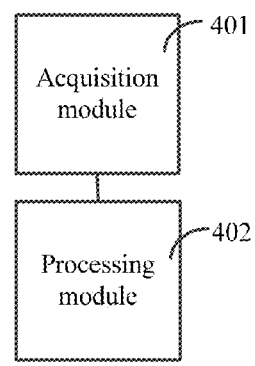
FIG. 4 is a block diagram illustrating an apparatus for processing an image according to an exemplary embodiment.

In an embodiment, as shown in FIG. 4, an apparatus for processing an image includes: an acquisition module 401, configured to acquire face information in a template image if receiving a request for processing an image containing a face; and a processing module 402, configured to apply the photo makeover on the face according to the face information in the template image.

In an embodiment, the face information includes any one or more of: positions and intervals of face organs, sizes of the face organs and the face, proportions between the face organs and the face, shapes of the face organs, angles and directions of the face organs, colors of the face organs and colors of the face.

Figure 5:
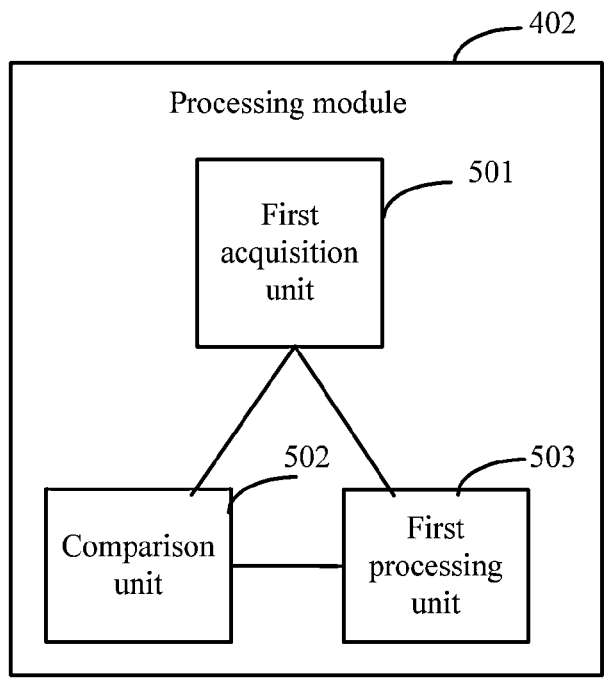
FIG. 5 is a first block diagram illustrating a processing module in an apparatus for processing an image according to an exemplary embodiment.

In an embodiment, as shown in FIG. 5, the processing module 402 may include: a first acquisition unit 501, configured to acquire face information in the image to be processed; a comparison unit 502, configured to obtain a comparison result by comparing the face information in the template image with the face information in the image to be processed; and a first processing unit 503, configured to apply the photo makeover on the face in the image to be processed according to the comparison result.

Figure 6:
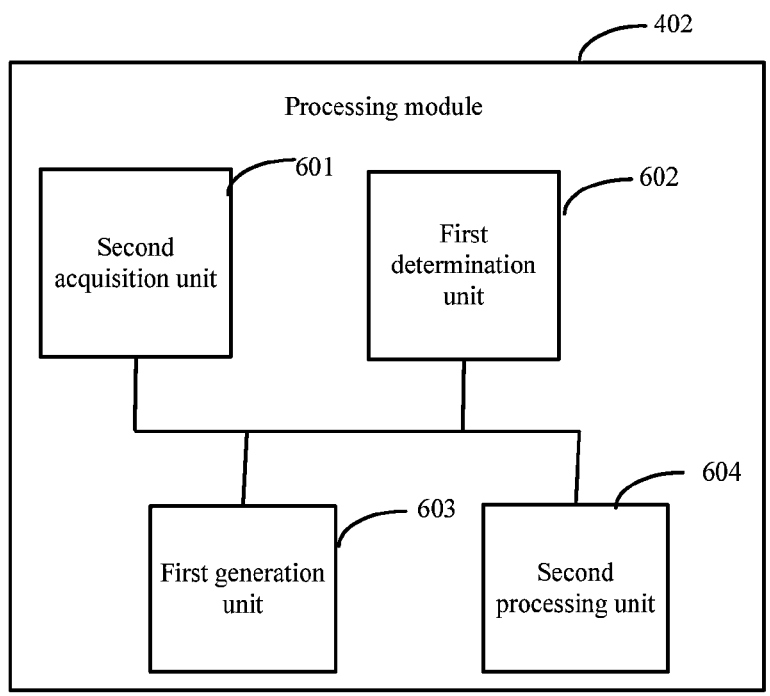
FIG. 6 is a second block diagram illustrating a processing module in an apparatus for processing an image according to an exemplary embodiment.

In an embodiment, as shown in FIG. 6, the processing module 402 may include: a second acquisition unit 601, configured to acquire face information in the image to be processed; a first determination unit 602, configured to determine whether the face information in the template image and the face information in the image to be processed are the same; a first generation unit 603, configured to generate a null makeover operation mode when the face information in the template image and the face information in the image to be processed are the same; and a second processing unit 604, configured to apply the photo makeover on the face in the image to be processed according to the null makeover operation mode.

Figure 7:
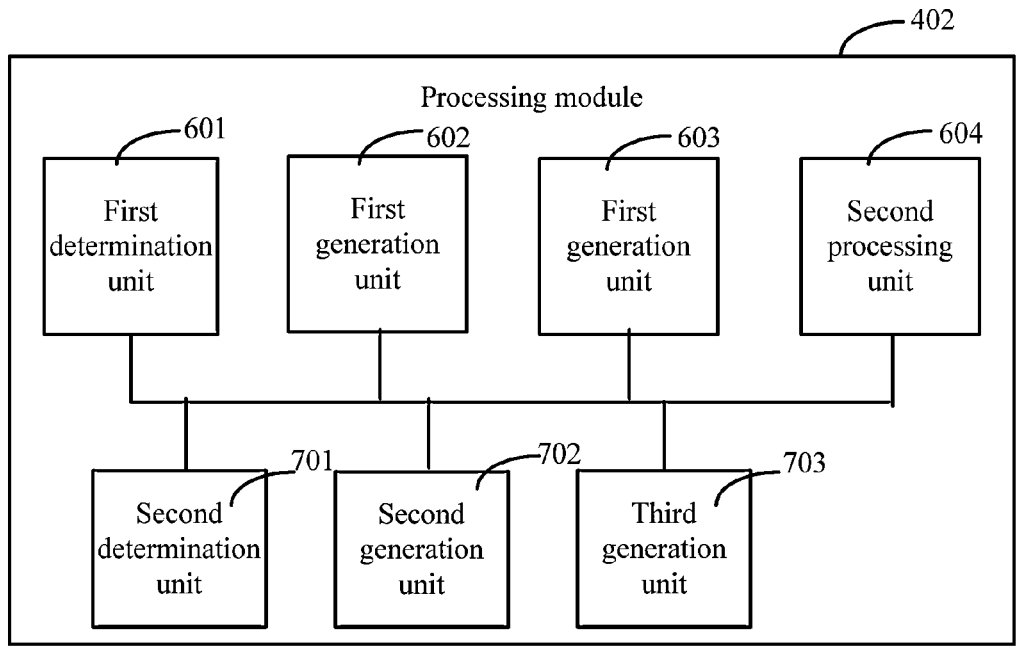
FIG. 7 is a third block diagram illustrating a processing module in an apparatus for processing an image according to an exemplary embodiment.

In an embodiment, as shown in FIG. 7, the processing module 402 shown in FIG. 6 may further include: a second determination unit 701, configured to, after the first determination unit 602 determines whether the face information in the template image and the face information in the image to be processed are the same, if they are not the same, determine whether the difference between the face information in the template image and the face information in the image to be processed is less than or equals to a first threshold; a second generation unit 702, if the difference between the face information in the template image and the face information in the image to be processed is less than or equals to a first threshold, configured to generate a first level makeover operation mode, and apply the photo makeover on the face in the image to be processed according to the first level makeover operation mode; and a third generation unit 703, if the difference between the face information in the template image and the face information in the image to be processed is greater than a second threshold that is greater than the first threshold, configured to generate a second level makeover operation mode, and apply the photo makeover on the face in the image to be processed according to the second level makeover operation mode.

Figure 8:
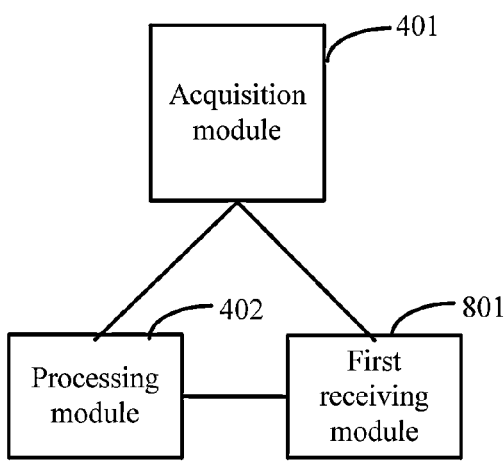
FIG. 8 is a detailed block diagram illustrating an apparatus for processing an image according to an exemplary embodiment.

In an embodiment, as shown in FIG. 8, the apparatus shown in FIG. 4 may further include: a first receiving module 801, configured to receive an input template image, before the acquisition module 401 acquires the face information in the template image.

Figure 9:
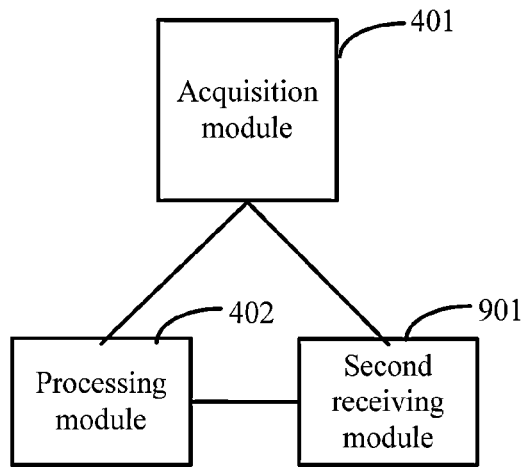
FIG. 9 is another detailed block diagram illustrating an apparatus for processing an image according to an exemplary embodiment.

Alternatively, in an embodiment, as shown in FIG. 9, the apparatus shown in FIG. 4 may further include: a second receiving module 901, configured to receive a selected template image, before the acquisition module 401 acquires the face information in the template image.

Figure 10:
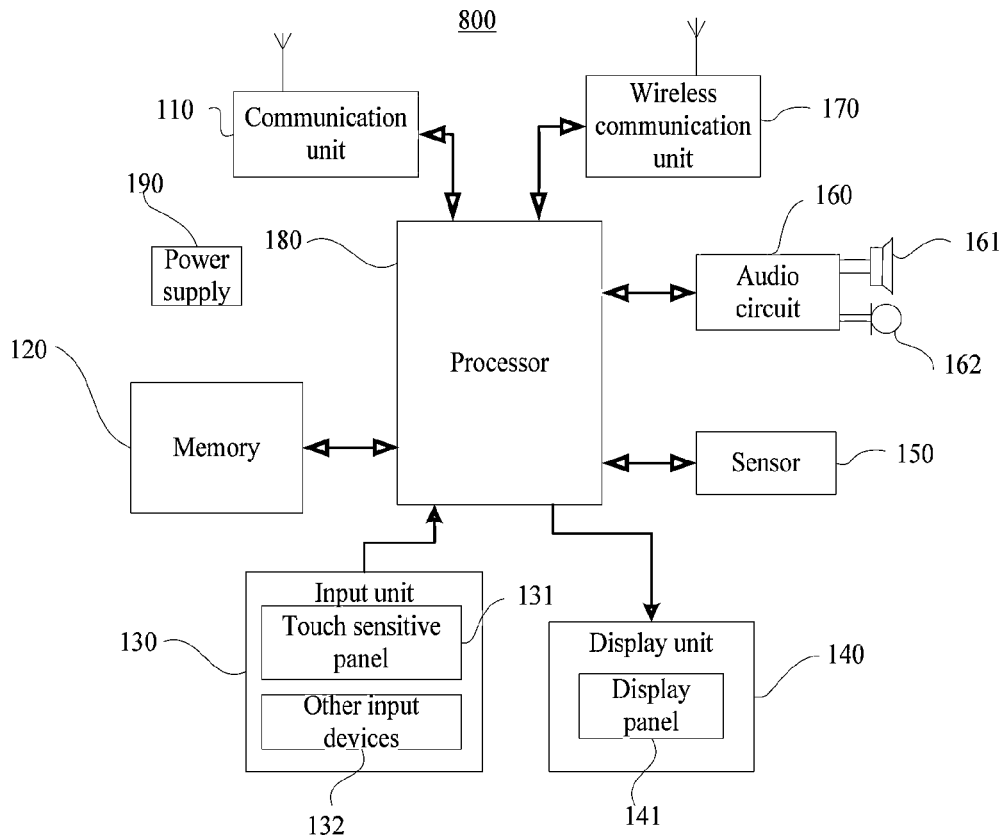
FIG. 10 is a block diagram illustrating a terminal device according to an exemplary embodiment.

FIG. 10 is a block diagram illustrating a terminal device according to an embodiment of the present disclosure. Referring to FIG. 10, the terminal is configured to perform the method provided in the above embodiment.

The terminal device 800 may include a communication unit 110, a memory 120 including one or more computer-readable storage media, an input unit 130, a display unit 140, a sensor 150, an audio circuit 160, a wireless communication module 170, a processor 180 including one or more processing cores, and a power supply 190 and other components. It should be appreciated by those skilled in the art that, the structure of the terminal device shown in FIG. 10 does not constitute a limitation to the terminal device, and it may include more or less components than what is illustrated, or combine some of the components, or have different component arrangements.

The communication unit 110 may be configured to transmit and receive information, or to transmit and receive signal during a procedure of calling. The communication unit 110 may be a network communication device such as a RF (Radio Frequency) circuit, a router, a modem, etc. In particular, when the communication unit 110 is a RF circuit, the communication unit 110 receives downlink information from a base station, and then transfers the information to one or more processors 180 to be processed. Also, the communication unit 110 transmits uplink data to the base station. Generally, the RF circuit as a communication unit includes but not limited to an antenna, at least one amplifier, a tuner, one or more oscillators, a subscriber identity module (SIM) card, a transceiver, a coupler, an LNA (Low Noise Amplifier), a duplexer, etc. Furthermore, the communication unit

110 may communicate with a network and other devices through wireless communication. The wireless communication may use any communication standards or protocols, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc. The memory 120 may be configured to store software programs and modules. The processor 180 performs various functional applications and data processing by running the software programs and modules stored in the memory 120. The memory 120 may mainly include a program storage area and a data storage area, wherein the program storage area may store operating systems, application programs required by at least one function (such as a function of sound playback, a function of image playback, etc.), etc.; and the data storage area may store data created during operation of the terminal device 800 (such as audio data, phone book, etc.), etc. In addition, the memory 120 may include a high-speed random access memory and may also include a non-volatile memory. For example, the memory 120 may include at least one disk storage device, a flash memory device, or other volatile solid-state memory devices. Accordingly, the memory 120 may also include a memory controller to provide access to the memory 120 performed by the processor 180 and the input unit 130.

The input unit 130 may be configured to receive input numbers or characters, and generate keyboard, mouse, joystick, optical or trackball input signals related to a user setting and the functional control. The input unit 130 may include a touch sensitive surface 131 and other input device 132. The touch sensitive surface 131, also known as a touch screen or a track pad, may collect user's touch operations on or near the touch sensitive surface 131 (such as an operation performed by users using any suitable object or accessory such as a finger, a touch pen and the like on or near the touch sensitive surface 131), and drive a corresponding connected device according to a preset program. Optionally, the touch sensitive surface 131 may include two parts of a touch detection device and a touch controller. Here, the touch detection device detects a touching position of the user, detects a signal caused by the touch operation, and transmits the signal to the touch controller. The touch controller receives touch information from the touch detection device, transforms it into coordinates of the touch point, and sends the coordinates to the processor 180. The touch controller may also receive a command from the processor 180 and execute the command. In addition, the touch sensitive surface 131 may be realized in various types, such as resistive type, capacitive type, infrared type and surface acoustic wave type, etc. In addition to the touch sensitive surface 131, the input unit 130 may also include other input device 132. The other input device 132 may include but not limited to one or more of a physical keyboard, functional keys (such as volume control keys, switch buttons, etc.), a trackball, a mouse, and a joystick.

The display unit 140 may be configured to display information input by the user or information provided for the user and various graphical user interfaces of the terminal device 800. These graphical user interfaces may consist of graphics, texts, icons, videos, and any combination thereof. The display unit 140 may include a display panel 141, and optionally, the display panel 141 may be configured with LCD (Liquid Crystal Display), OLED (Organic Light-Emitting Diode), etc. Further, the touch sensitive surface 131 may cover the display panel 141. When a touch operation on or near the touch sensitive surface 131 is detected by the touch sensitive surface 131, the touch operation is sent to the processor 180 to determine the type of touch event, and corresponding visual output will be provided on the display panel 141 by the processor 180 according to the type of touch event. Although in FIG. 10, the touch sensitive surface 131 and the display panel 141 are two separate components to realize input and output functions, in some embodiments, the touch sensitive surface 131 and the display panel 141 may be integrated to realize input and output functions.

The terminal device 800 may further include at least one kind of sensor 150, such as a light sensor, a motion sensor and other sensors. The light sensor may include an ambient light sensor and a proximity sensor. Here, the ambient light sensor may adjust the brightness of the display panel 141 according to the brightness of the ambient light. The proximity sensor may turn off the display panel 141 and/or backlight when the terminal device 800 moves close to ear. As one kind of the motion sensor, a gravity acceleration sensor may detect the acceleration in each direction (typically on three axes), and may detect the magnitude and the direction of gravity when it is stationary, which may be used in the applications for recognizing the attitudes of the mobile phone (such as horizontal and vertical screen switching, related games, attitude calibration of a magnetometer), functions related to vibration recognizing (such as a pedometer, clicking), etc. The terminal device 800 may also be equipped with other sensors such as a gyroscope, a barometer, a hygrometer, a thermometer, an infrared sensor, etc., which will not be redundantly described herein.

The audio circuit 160, a speaker 161 and a microphone 162 may provide an audio interface between the user and the terminal device 800. The audio circuit 160 may transform received audio data into electrical signals which are transmitted to the speaker 161 and transformed into sound signals to be output by the speaker 161. On the other hand, the microphone 162 transforms collected sound signals into electrical signals which are received and transformed into audio data by the audio circuit 160. After being output to the processor 180 to be processed, the audio data is transmitted to, for example, another terminal device via the RF circuit 110, or output to the memory 120 for further processing. The audio circuit 160 may also include an ear bud jack to allow a communication between an external earphone and the terminal device 800.

In order to achieve wireless communication, the terminal device may be equipped with a wireless communication unit 170 which may be a WiFi (Wireless Fidelity) module. WiFi is a short-range wireless transmission technology. The terminal device 800 allows the user to send and receive emails, browse webpages and access streaming media, etc. through the wireless communication unit 170, which provides the user with a wireless broadband Internet access. Although FIG. 10 shows the wireless communication unit 170, it should be appreciated that, the wireless communication unit 170 is not a necessary component of the terminal device 800, and may be omitted as desired without changing the essential scope of the disclosure.

The processor 180 is a control center of the terminal device 800 that connects various parts of the entire mobile phone through various interfaces and circuits, performs various functions and data processing of the terminal device 800 by running or executing the software programs and/or modules stored in the memory 120 and by invoking data stored in the memory 120, so as to monitor the overall mobile phone. Optionally, the processor 180 may include any one or more processing cores. The processor 180 may be integrated with an application processor that mainly processes operating systems, user interfaces and application programs, and a modem processor that mainly processes the wireless communication. It should be appreciated that, the above modem processor may not be integrated into the processor 180.

The terminal device 800 may also include a power supply 190 (such as a battery) to supply power to each component. The power supply may be logically connected to the processor 180 through a power supply management system, so as to achieve the functions such as charge, discharge and power consumption managements, etc. through the power supply management system. The power supply 190 may also include one or more components of a DC or AC power, a recharge system, a power failure detection circuit, a power converter or an inverter, a power status indicator, etc.

Although not shown, the terminal device 800 may also include a camera, a Bluetooth module, etc., which is not described repeatedly. In the present embodiment, the terminal device further includes a memory and one or more instruction modules stored in the memory, and the terminal device is configured to execute the one or more instruction modules by one or more processors, the one or more instruction modules containing instructions to perform the following operations of the method provided by the embodiments of the present disclosure: acquiring face information from a template image, if receiving a request for processing an image containing a face; and applying a photo makeover on the face according to the face information acquired from the template image. In some exemplary embodiments, the memory may further include one or more instruction modules further configured to execute steps described in the above FIG. 2A and FIG. 3A.

In the embodiments of the present disclosure, a template image and a face in an image to be processed may be recognized automatically, and a cosmetic process may be performed to a portion that needs to be cosmetically processed in the image to be processed according to face information in the template image. Thereby the user needs not to manually set cosmetic parameters one by one, which is convenient for the user to process, and thus saves time for the user and improves the efficiency of the cosmetic process. Moreover, respective cosmetic process may be performed according to the difference between the face information in the template image and the face information in the image to be processed, to satisfy the various demands of the user.

In addition, the mobile terminal according to the present disclosure may typically be various handheld terminal devices, such as a mobile phone, a personal digital assistant (PDA), and the like. Therefore, the scope of the present disclosure is not limited to a particular type of mobile terminal.

In addition, the method according to the present disclosure may also be implemented by a computer program executed by a CPU. When executed by the CPU, the computer program performs the above functions defined in the method according to the present disclosure.

In addition, the above steps of the method and the units of the system may also by implemented with a controller and a computer-readable storage device which stores computer programs that cause the controller to realize the above steps and functions of the units.

In addition, it should be appreciated that the above mentioned computer-readable storage device may be a volatile memory or a nonvolatile memory, or may include the both. For example, but without limitation, the nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM) which may serve as an external cache RAM memory. As an example, but without limitation, the RAM may of various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct Rambus RAM (DRRAM). The storage device according to the disclosed aspects is intended to include but not limited to these and other suitable types of memories.

It should be appreciated by those skilled in the art that, various exemplary logical blocks, modules, circuits, and algorithm steps described in conjunction with the present disclosure may be implemented as electronic hardware, computer software or combination of both. In order to clearly illustrate the interchangeability between the hardware and the software, a general description has been given to various illustrative components, blocks, modules, circuits and functions of steps. Whether such functions will be implemented as software or hardware depends on the particular application and the restriction from the design of the whole system. Those functions may be realized in various means for each of the particular application by those skilled in the art without departing the scope of the present disclosure.

Various illustrative logical blocks, modules and circuits described in conjunction with the present disclosure may be implemented or performed by the following components that are designed to perform the above functions: a general purpose processor, a digital signal processor (DSP), a dedicated integrated circuit (ASIC), a field programmable gate array (FPGA) or other programmable logic device, discrete gates or transistor logics, discrete hardware components or any combination of these components. The general purpose processor may be a microprocessor. Alternatively, the processor may be any one of a conventional processor, a controller, a microcontroller, or a state machine. The processor may be implemented as combination of computing devices, such as combination of a DSP and a microprocessor, a plurality of microprocessors, one or more microprocessors in conjunction with a DSP core, or any other such configuration.

The method and steps of the algorithm described in conjunction with the present disclosure may be directly contained in hardware, in a software module executed by a processor or in combination of the both. The software may reside in a RAM memory, a flash memory, a ROM memory, an EPROM memory, an EEPROM memory, a registers, a hard disk, a removable disk, a CD-ROM, or any other storage medium known in the art. An exemplary storage medium is coupled to the processor such the processor can read information from the storage medium or write information thereto. In an alternative embodiment, the storage medium maybe integrated with the processor. The processor and the storage medium may reside in an ASIC which may reside in a user terminal. In an alternative embodiment, the processor and the storage medium may reside in a user terminal as discrete components.

In one or more exemplary designs, the above functions may be implemented in hardware, software, firmware, or any combination thereof. If implemented in software, the above functions may be stored in a computer readable medium as one or more instructions or codes, or transmitted through the computer readable medium. The computer readable medium includes computer storage medium and communication medium. The communication media includes any medium that may be used to transmit computer programs from one location to another location. The storage medium may be any available medium that is accessible by a general or special computer. For example, but without limitation, the computer readable medium may include a RAM, a ROM, an EEPROM, a CD-ROM or other CD storage devices, disk storage device or other magnetic storage devices, or any other medium that may be used to carry or store the required program codes in a form of instructions or data structure and may be accessible by a general or special computer or a general or special processor. In addition, any connection may be appropriately called a computer-readable medium. For example, if a coaxial cable, a fiber optic cable, a twisted pair, a digital subscriber line (DSL) or wireless technologies such as infrared rays, radio and microwave are used to transmit software from a website, a server or other remote source, the above coaxial cable, the fiber optic cable, the twisted pair, the DSL or wireless technologies such as infrared rays, radio and microwave are all within the definition of the medium. As used herein, the disk and the optical disk includes a compression disk (CD), a laser disc, an optical disk, a digital versatile disc (DVD), a floppy disks, a blue-ray disk, among which the magnetic disk normally represents data magnetically, and the optical disk represents data optically by utilizing a laser. The combination of the above should also be included in the scope of the computer readable medium.

Although the exemplary embodiments of the present disclosure has been illustrated in the above, it should be noted that, various alteration and modification may be made without departing the scope of the present disclosure which is defined by the claims. The functions, steps and/or operations of the method claims according to the described embodiments of the present disclosure, may not necessarily be performed in a particular order. In addition, although elements of the present disclosure may be described or prescribed in a single form, multiple forms may also be devised, unless the single form is explicitly prescribed.

The objects, technical solutions and advantageous effects of the present disclosure have been explained in a further detail with the above specific embodiments. It should be appreciated that, the above are merely specific embodiments of the present disclosure, and not used to limit the scope of the present disclosure. Any alteration, equivalent replacement, modification and the like within the spirit and principle of the present disclosure should be embraced in the protection scope of the present disclosure.

We claim:

1. A method for processing an image, comprising:
    acquiring face information from a template image, if receiving a request for processing an image containing a face;
    acquiring face information from the image to be processed;
    determining whether the face information in the template image and the face information in the image to be processed are the same;
    when the face information in the template image and the face information in the image to be processed are the same, generating a null makeover operation mode; and applying the photo makeover on the face according to the null makeover operation mode.

2. The method according to claim 1, wherein the face information comprises one or more of positions and intervals of face organs, sizes of the face organs and the face, proportions between the face organs and the face, shapes of the face organs, angles and directions of the face organs, colors of the face organs, and colors of the face.

3. The method according to claim 1, further comprising:
    when the face information in the template image and the face information in the image to be processed are not the same, determining whether the difference between the face information in the template image and the face information in the image to be processed is less than or equals to a first threshold;
    when the difference between the face information in the template image and the face information in the image to be processed is less than or equals to the first threshold, generating a first level makeover operation mode; and
    applying the photo makeover on the face according to the first level makeover operation mode.

4. The method according to claim 3, further comprising:
    when the difference between the face information in the template image and the face information in the image to be processed is greater than a second threshold, generating a second level makeover operation mode; and
    applying the photo makeover on the face according to the second level makeover operation mode,
    wherein the second threshold is greater than the first threshold.

5. The method according to claim 1, wherein the method further comprises a step of obtaining the template image before acquiring the face information from the template image.

6. The method according to claim 5, wherein the template image is obtained by receiving an image inputted by a user and using the inputted image as the template image.

7. The method according to claim 5, wherein the template image is obtained by determining an image selected by a user and using the selected image as the template image.

8. A terminal device, comprising:
    one or more processors;
    a memory; and
    one or more instruction modules stored in the memory and configured to be executed by the one or more processors, the one or more instruction modules comprising instructions for:
    acquiring face information from a template image, if receiving a request for processing an image containing a face;
    acquiring face information from the image to be processed;
    determining whether the face information in the template image and the face information in the image to be processed are the same;
    when the face information in the template image and the face information in the image to be processed are the same, generating a null makeover operation mode; and
    applying the photo makeover on the face according to the null makeover operation mode.

9. The terminal device according to claim 8, wherein the face information comprises one or more of positions and intervals of face organs, sizes of the face organs and the face, proportions between the face organs and the face, shapes of the face organs, angles and directions of the face organs, colors of the face organs, and colors of the face.

10. The terminal device according to claim 8, further comprising:
    when the face information in the template image and the face information in the image to be processed are not the same, determining whether the difference between the face information in the template image and the face information in the image to be processed is less than or equals to a first threshold;

when the difference between the face information in the template image and the face information in the image to be processed is less than or equals to the first threshold, generating a first level makeover operation mode; and applying the photo makeover on the face according to the first level makeover operation mode.

11. The terminal device according to claim 10, further comprising:

when the difference between the face information in the template image and the face information in the image to be processed is greater than a second threshold, generating a second level makeover operation mode; and applying the photo makeover on the face according to the second level makeover operation mode, wherein the second threshold is greater than the first threshold.

12. The terminal device according to claim 8, wherein the method further comprises a step of obtaining the template image before acquiring the face information from the template image.

13. The terminal device according to claim 12, wherein the template image is obtained by receiving an image inputted by a user and using the inputted image as the template image.

14. The terminal device according to claim 12, wherein the template image is obtained by determining an image selected by a user and using the selected image as the template image.

15. A non-transitory readable storage medium including instructions, executable by one or more processors in a terminal device, for performing a method for processing an image, the method comprising:

acquiring face information from a template image, if receiving a request for processing an image containing a face;

acquiring face information from the image to be processed;

determining whether the face information in the template image and the face information in the image to be processed are the same;

when the face information in the template image and the face information in the image to be processed are the same, generating a null makeover operation mode; and applying the photo makeover on the face according to the null makeover operation mode.

* * * * *